United States Patent Office 3,222,252
Patented Dec. 7, 1965

3,222,252
PREPARATION AND METHOD FOR THE PREVENTION, TREATMENT, AND CONTROL OF MASTITIS IN BOVINE UDDERS
Heinz J. Kraus, 4273 Seven Hills Road, Castro Valley, Calif.
No Drawing. Filed Nov. 1, 1962, Ser. No. 234,856
17 Claims. (Cl. 167—53.2)

The invention relates to skin conditioners and more particularly to preparations used on the skin to combat infection, heal abrasions and inflammation, and generally to improve the appearance and physical condition of the skin, the present invention being particularly adapted for use on bovine udders.

An object of the present invention is to provide a preparation of the character described which may be easily and quickly applied for the effective treatment of dry, chapped skin of the teats and skin inflammation, and for the treatment, preventative control of, and effective protection against mastitis.

Another object of the present invention is to provide a skin preparation of the character described which is non-toxic to human consumption and imparts no flavor to the milk nor produces any other quality defect in the milk.

A further object of the present invention is to provide a skin preparation of the character above which may be used daily over long periods of time without irritation to udder tissues or otherwise losing its effectiveness or decrease in the beneficial results obtained.

The invention possesses other objects and features of advantage, some of which will appear in the following description of the preferred forms of the invention. It is to be understood, however, that variations in the description and examples given may be adopted within the scope of the invention as set forth in the claims.

Mastitis is an infectious disease of the bovine udder. The annual loss caused by the disease in the United States has been estimated at three hundred million dollars. It has been established that the disease spreads from animal to animal. The only pathway of transmission is through the teat orifice. Poor udder hygiene and physical damage to the teats are primarily responsible for the high incidence of mastitis. The need for a conditioning and protective compound which is inexpensive and easy to apply has been recognized by veterinarians and dairymen alike. Such a preparation as would reduce the incidence of mastitis and improve the physical condition of the udder and teats would substantially increase the per capita production of a dairy herd and extend the productive life of the individual animals.

Mastitis is also sometimes considered as an inflammatory state in the milk-producing tissue of the bovine udder caused by chemical, thermal, traumatic change or by the action of microorganisms. Infectious bovine mastitis is the type caused by microorganisms.

The preparation of the present invention is preferably applied to the bovine udder by spraying of the teat immediately after milking. Milk residues normally adhering to the teat orifice after milking offer an ideal breeding ground for bacteria and for attracting flies. This residue is removed and/or neutralized by the applied spray and the bactericide included therein. Secondly, there is provided within the spray, oil emollients which penetrate and are absorbed into the skin to soften dry, chapped skin of the teats and to encourage the development of soft, smooth and healthy tissue. Deep cracks sometimes found in the tissue around the teat orifice may be most effectively treated by the preparation and the formation of calluses prevented. The use of the preparation has also been found effective in the treatment and removal of cow pox lesions. Lastly, the preparation of the present invention dries quickly to provide a protective film over the teat tissue and across the teat orifice and barrier against penetration of infectious organisms and the setting up of a repellent surface to water, dirt, manure and other foreign particles. The preparation also functions to lubricate the skin so as to resist frictional irritation caused by the mechanical milking machine and the irritating effect of udder washing.

The preparation of the present invention consists briefly of an oleaginous spray of finely divided droplets composed mainly of a non-toxic, substantially tasteless and odorless, edible oil which will provide the emollient and film forming characteristics desired. The main component of the preparation is preferably a blend of vegetable oils of the semi-drying and drying classes. Vegetable oils may be generally classed as non-drying, semi-drying, and drying. The latter two classes are used in the present preparation. Semi-drying vegetable oils include soybean oil, cotton seed oil, sesame oil, beechnut oil and corn oil. The drying properties of this group of oils is due in part to the degree of unsaturation and the structure of the component glycerides in the oil. The degree of unsaturation can be expressed by the iodine number of the compound. It is a measure of the proportion of unsaturated linkages present and is usually determined in the analysis of oils and fats. Arranged according to their iodine number, the aforementioned semi-drying vegetable oils are as follows:

Soybean oil _____ 134
Sesame oil _____ 117
Cotton seed oil _____ 111
Beechnut oil _____ 111
Corn oil _____ 111

The class of vegetable drying oils include the following arranged according to their iodine number:

Linseed oil _____ 202
Walnut oil _____ 150
Safflower oil _____ 141
Sunflower oil _____ 136

Another important factor in the present preparation is the content of various fatty acid esters present in the glyceride structure of the various oils. The fatty acid esters are known as skin emollients and what is of equal importance in the present invention, formers of non-tacky films. They include all fatty acid esters of low molecular weight monohydric alcohols and all polyol esters of fatty acids. Compounds in the first group include butyl stearate, isopropyl palmitate, isopropyl myristate. Compounds belonging to the second group are glycerol monostearate, propylene glycol monostearate, ethylene glycol monostearate, polyethylene glycol monostearate.

For the purposes of the present invention, this ingredient may be defined as a fatty acid ester of the class consisting of fatty acid esters of low molecular weight alcohols and polyol esters of fatty acids; and in accordance with the present invention, this ingredient is included in a proportion of up to 10%.

Preferably, I select from this group for use in the commercial production of the material, the combination of palmitate and myristate which is commercially available from Sindar Corporation of Los Angeles and New York under the label Deltyl Extra and which consists of isopropyl palmitate-myristate. The concentration used of this material in the product of the present invention may be varied from about 2% to 10%. The main function of this material, as above noted, is its ability in cooperation with the oils used to provide a nontacky film. The material also has an emollient effect when it is used at a level not to exceed about 25%. It is considered that the upper limit of the fatty acid ester is approximately 10% since additional quantities of this material may produce an irritating effect on the tissue due to too strong an emollient effect. The relationship of the use and content of this fatty acid ester ingredient to the selection of the drying oil can be thus seen.

In the selection of the oil or oils used, a straight drying oil is not desired due to the fact that such an oil forms too heavy a film with too little penetration or absorption into the skin of the animal. Then too, the product should be used after each milking, twice a day, and an accumulated build-up of film which occurs in the exclusive use of a drying oil, is to be avoided. What is desired is that a major part of the oils is absorbed by the skin so as to replace the natural skin oil which is withdrawn by the mechanical milking process and by the use of washing and disinfection solutions. At the same time, an external skin lubricant is needed to decrease the irritating effect of the friction caused by the mechanical milking machine. As a fourth requirement, the product of the present invention provides a requisite film forming particularly across the teat orifice and to cover tiny cracks in the skin and serve as a water and dust repellent surface for the teat. The film across the teat orifice provides a mechanical barrier to bacteria penetration into the toat canal.

In order to obtain this desired combination of skin penetrating and film forming characteristics, I use a blend of semi-drying and drying oils in conjunction with the aforementioned fatty acid esters. The preferred blend selects soybean oil and cotton seed oil out of the class of semi-drying oils and safflower oil out of the class of drying oils. Soybean oil is selected in part for its high lecithin content. Lecithin provides an important cell regenerating stimulant in the present compound encouraging replacement of dead, horny, dry epithelial tissue by young, smooth, healthy, living tissue.

As above noted, in the blend of oils, it is desirable that a drying oil be included in order to obtain the desired film forming property. Of the drying oils noted, safflower oil is preferred for a commercial embodiment of the invention since it is the most economically available of the group in odorless and tasteless form. At this writing, linseed oil has to be ruled out as not yet being available in a satisfactory edible form. The drying oil must be included in a proportion of about 20 to 30%. By using up to the upper limit, approximately 10%, of palmitate myristate, the drying oil content may be reduced to about 20%. However, it is desired for the reasons above noted to keep the palmitate myristate proportion in the range of about 4 to 6%, and in this range, the drying oil should be used toward the top of its level, viz, about 30%.

Certain fish oils such as cod liver oil, whale oil, sperm oil would fall into the class of drying oils and would therefore be theoretically usable. However, at this writing, none of these oils are commerially available in a tasteless and odorless form, and consequently, need to be ruled out for that reason. Also, these fish oils are highly subject to processing rancidity.

The essential character of the main oleaginous portion of the spray may be characterized as a blend of nontoxic, substantially tasteless and odorless, edible, semi-drying and drying oils and a fatty acid ester of the class consisting of fatty acid esters of low molecular weight alcohols and polyol esters of fatty acids. Other ingredients which may be beneficially used in the preparation include hexachlorophene, allantoin, and cetyl alcohol.

Hexachlorophene is a bactericidal agent which is non-toxic, non-irritating to skin tissue and flavorless in regard to milk. It is soluble in the oleaginous portion of the spray and is carried thereby into the teat canal and across the teat orifice and into intimate admixture with any milk residue encountered. It is highly stable in the presence of organic matter which makes it a preferred compound for inclusion as a bactericidal material in the present preparation. Hexachlorophene persists in its bactericidal concentration for at least twelve hours which is of quite sufficient duration from one milking to the next, which regularly occurs on a twelve-hour schedule. Hexachlorophene is preferably included in the preparation in a concentration of about 0.5 to 2.0 parts by weight.

Allantoin is one of the best known healing agents and provides a healing curative action and stimulation of formation of new tissue. Allantoin aids in speeding up the healing process of cuts and bruises which are quite prevalent on the teats of dairy cattle. It is not soluble in any one of the other materials used but is distributed throughout the preparation in a fine suspension. This may be accomplished in the compounding procedure by vigorous mixture or shearing action of the ingredients as well as the application of heat in order to put the allantoin into suspension. It may be suspended in the isopropyl palmitate-myristate as a pre-mixing procedure. Allantoin is preferably included in the concentration of about 0.01 to 0.1 part by weight.

Cetyl alcohol induces hydration of dry skin and assists in the forming of occlusive, water repellent film. Other very closely related alcohols and which are considered alternatives are stearyl alcohol, lauryl alcohol and myristyl alcohol. An alcohol of the class so described may be beneficially included in a range of about 0.2 to 2.0 parts by weight.

A preferred formulation is as follows:

*Example 1*

| | Parts by weight |
|---|---|
| Soybean oil | 20 |
| Cotton seed oil | 39.95 |
| Safflower oil | 30 |
| Isopropyl palmitate-myristate | 8 |
| Hexachlorophene | 1 |
| Allantoin | 0.05 |
| Cetyl alcohol | 1 |

A preferred compounding procedure is as follows.

| | Parts by weight |
|---|---|
| Portion A: | |
| Safflower oil | 30 |
| Soybean oil | 20 |
| Cotton seed oil | 39.95 |
| Portion B: | |
| Isopropyl palmitate-myristate | 8 |
| Cetyl alcohol | 1 |
| Hexachlorophene | 1 |
| Allantoin | 0.05 |

Weigh the ingredients of Portion A into a container provided with a source of agitation.

Weigh the ingredients of Portion B into a separate container provided with a source of heat and agitation and raise the temperature to 80° C. until the ingredients are completely in solution. Allantoin will disperse into a fine suspension. Add Portion B to A stirring continuously. Continue stirring until mixture has returned to room temperature.

The liquid prepared as above is preferably packaged in a pressurized container for easy and convenient spraying of the udder and teats after each milking. A conventional style of disposable, low cost, metal container having a manually operable spray valve dispenser and made for pressurizing may be used. Any suitable gas propellant may be included as part of the contents of the aerosol package thus formed for providing the force for making the product a self-dispensing spray. Fluorinated hydrocarbons presently used in cosmetic aerosols may be used such as genetron. A container of about 68 grams of liquid as prepared above and 102 grams of genetron under a pressure of about 34 pounds per square inch is suggested. Genetron is available in closely related compounds dichlorodifluoromethane, Genetron-12, and trichoromonofluoromethane, Genetron-11.

With the preparation packaged as above described, it may be most conveniently and quickly applied to the bovine udder by holding the spray valve nozzle dispenser approximately six inches below the teat orifice and applying the product in short squirts to each teat upon removal of the milking unit. Each teat should be fully covered and the user should abstain from touching the teat after the application of the spray. It is estimated that over 50% of the preparation will be absorbed in the skin to provide the oil replacement emollient action desired. In about 10 to 15 minutes a thin dry and non-tacky film forms over the skin and across the teat orifice.

Other examples of alternate formulations of the preparation of the present invention follow.

Corn oil may be substituted for soybean oil and cotton seed oil used in Example 1. A suggested formulation would be:

*Example 2*

| | Parts by weight |
|---|---|
| Corn oil | Approximately 70 |
| Safflower oil | Approximately 25 |
| Fatty acid ester | Approximately 4 |
| Hexachlorophene | Approximately 0.5 |
| Cetyl alcohol | Approximately 0.5 |
| Allantoin | Trace |

An example using sesame oil as the semi-drying oil in the formulation follows:

*Example 3*

| | Parts by weight |
|---|---|
| Sesame oil | Approximately 60 |
| Safflower oil | Approximately 30 |
| Fatty acid ester | Approximately 8 |
| Hexachlorophene | Approximately 1 |
| Cetyl alcohol | Approximately 0.5 |
| Allantoin | Approximately 0.5 |

An example using beechnut oil as the semi-drying oil in the combination follows:

*Example 4*

| | Parts by weight |
|---|---|
| Beechnut oil | Approximately 75 |
| Safflower oil | Approximately 20 |
| Fatty aicd ester | Approximately 4 |
| Hexachlorophene | Approximately 1 |

Example 4 does not include the optional use of healing and humidifying agents.

The use of sunflower oil as the drying oil in the preparation is illustrated in the following formulation:

*Example 5*

| | Parts by weight |
|---|---|
| Sunflower oil | Approximately 30 |
| Soybean oil | Approximately 20 |
| Cotton seed oil | Approximately 39.95 |
| Fatty acid ester | Approximately 8 |
| Cetyl alcohol | Approximately 1 |
| Hexachlorophene | Approximately 1 |
| Allantoin | Approximately 0.05 |

Walnut oil is used as the drying oil in the following formulation:

*Example 6*

| | Parts by weight |
|---|---|
| Walnut oil | Approximately 20 |
| Soybean oil | Approximately 26 |
| Cotton seed oil | Approximately 39.95 |
| Fatty acid ester | Approximately 4 |
| Cetyl alcohol | Approximately 1 |
| Hexachlorophene | Approximately 1 |
| Allantoin | Approximately 0.05 |

Another example of the use of walnut oil and a variation in the relative proportions of the drying and semi-drying oils follows:

*Example 7*

| | Parts by weight |
|---|---|
| Walnut oil | Approximately 25 |
| Soybean oil | Approximately 30 |
| Cotton seed oil | Approximately 34.95 |
| Fatty acid ester | Approximately 4 |
| Cetyl alcohol | Approximately 1 |
| Hexachlorophene | Approximately 1 |
| Allantoin | Approximately 0.05 |

While the preparation of the present invention has been especially designed for use as a cosmetic and teat canal sealant for bovine udders, and has uniquely valuable properties in connection with such use, it will be understood that the preparation may have broader aspects and uses as a general skin conditioner for the treatment of bruises, rash, inflammation and the like. The term "cosmetic" as used herein is intended to include skin preparations which are used to improve the tone, general health and appearance of the skin.

I claim:

1. A preparation for the prevention, treatment and control of mastitis in udders comprising, a blend of non-toxic, substantially tasteless, odorless, edible semi-drying and drying oils; and a fatty acid ester skin emollient film forming agent, composed of the reaction product of a fatty acid and a member of the group consisting of low molecular weight monohydric alcohols, glycerol, propylene glycol, ethylene glycol and polyethylene gylcol.

2. The preparation as defined in claim 1 wherein said fatty acid ester is butyl stearate.

3. The preparation as defined in claim 1 wherein said fatty acid is isopropyl palmitate.

4. The preparation as defined in claim 1 wherein said fatty acid is isopropyl myristate.

5. A preparation as defined in claim 1 wherein said fatty acid ester is glycerol monostearate.

6. The preparation as defined in claim 1 wherein said fatty acid ester is propylene glycol monostearate.

7. A preparation as defined in claim 1 wherein said fatty acid ester is ethylene glycol monostearate.

8. The preparation as defined in claim 1 wherein said fatty acid ester is polyethylene glycol monostearate.

9. The preparation as defined in claim 1 wherein said ingredients are combined in substantially the following proportions taken in parts by weight:

| | Percent |
|---|---|
| Semi-drying oil | 60 to 76 |
| Drying oil | 20 to 30 |
| Fatty acid ester | 4 to 10 |

10. The preparation as defined in claim 1 wherein said semi-drying oil is of the group consisting of soybean oil, cotton seed oil, sesame oil, beechnut oil and corn oil; and said drying oil is of the group consisting of safflower oil, sunflower oil and walnut oil.

11. A preparation for the prevention, treatment and control of mastitis in udders comprising, the following ingredients in substantially the following proportions taken in parts by weight:

| | |
|---|---|
| Safflower oil | 20 to 30 |
| Soybean oil | 20 to 25 |
| Cotton seed oil | 40 to 50 |
| Isopropyl palmitate-myristate | 4 to 10 |

12. A preparation for the prevention, treatment and control of mastitis in udders comprising a blend of a semi-drying oil of the group consisting of soybean oil, cotton seed oil, sesame seed oil, beechnut oil, and corn oil; a drying oil of the group consisting of safflower oil, sunflower oil and walnut oil; a fatty acid ester emollient film forming agent, composed of the reaction product of a fatty acid and a member of the group consisting of low molecular weight monohydric alcohols, glycerol, propylene glycol, ethylene glycol and polyethylene glycol; a second alcohol of the group consisting of cetyl alcohol, stearyl alcohol, lauryl alcohol and myristyl alcohol; hexachlorophene; and allantoin; the aforementioned ingredients being combined in substantially the following proportions taken in parts by weight:

| | |
|---|---|
| Semi-drying oil | 60 to 76 |
| Drying oil | 20 to 30 |
| Fatty acid ester | 4 to 10 |
| Alcohol | 0.2 to 2.0 |
| Hexachlorophene | 0.5 to 2.0 |
| Allantoin | 0.01 to 0.1 |

13. A preparation for the prevention, treatment and control of mastitis in udders comprising the following ingredients in substantially the following proportions taken in parts by weight:

| | |
|---|---|
| Safflower oil | 20 to 30 |
| Soybean oil | 20 to 25 |
| Cotton seed oil | 40 to 50 |
| Isopropyl palmitate-myristate | 4 to 10 |
| Cetyl alcohol | 0.2 to 2.0 |
| Hexachlorophene | 0.5 to 2.0 |
| Allantoin | 0.01 to 0.1 |

14. The method for the prevention, treatment and control of mastitis in udders comprising, applying to the udder teats a blend of non-toxic substantially tasteless and odorless, edible semi-drying and drying oils and a fatty acid ester skin emollient film forming agent, composed of the reaction product of a fatty acid and a member of the group consisting of low molecular weight monohydric alcohols, glycerol, propylene glycol, ethylene glycol and polyethylene glycol in a quantity and position to produce upon drying a barrier across the teat orifice.

15. The method for the prevention, treatment and control of mastitis in bovine udders comprising, applying to the udder teats a preparation composed of a blend of a semi-drying oil of the group consisting of soybean oil, cotton seed oil, sesame seed oil, beechnut oil, and corn oil; a drying oil of the group consisting of safflower oil, sunflower oil and walnut oil; a fatty acid ester skin emollient film forming agent, composed of the reaction product of a fatty acid and a member of the group consisting of low molecular weight monohydric alcohols, glycerol, propylene glycol, ethylene glycol and polyethylene glycol; a second alcohol of the group consisting of cetyl alcohol, stearyl alcohol, lauryl alcohol and myristyl alcohol; hexachlorophene; and allantoin; the aforementioned ingredients being combined in substantially the following proportions taken in parts by weight:

| | |
|---|---|
| Semi-drying oil | 60 to 76 |
| Drying oil | 20 to 30 |
| Fatty acid ester agent | 4 to 10 |
| Alcohol | 0.2 to 2.0 |
| Hexachlorophene | 0.5 to 2.0 |
| Allantoin | 0.01 to 0.1 |

16. The method for prevention, treatment and control of mastitis in udders comprising, applying to the udder teats a preparation composed of the following ingredients in substantially the following proportions taken in parts by weight:

| | |
|---|---|
| Safflower oil | 20 to 30 |
| Soybean oil | 20 to 25 |
| Cotton seed oil | 40 to 50 |
| Isopropyl palmitate-myristate | 4 to 10 |

17. The method for prevention, treatment and control of mastitis in udders comprising, applying to the udder teats a preparation composed of the following ingredients in substantially the following proportions taken in parts by weight:

| | |
|---|---|
| Safflower oil | 20 to 30 |
| Soybean oil | 20 to 25 |
| Cotton seed oil | 40 to 50 |
| Isopropyl palmitate-myristate | 4 to 10 |
| Cetyl alcohol | 0.2 to 2.0 |
| Hexachlorophene | 0.5 to 2.0 |
| Allantoin | 0.01 to 0.1 |

References Cited by the Examiner

UNITED STATES PATENTS 2,968,628  1/1961  Reed _____ 167—828

FOREIGN PATENTS 130,346  3/1946  Australia.

OTHER REFERENCES

Milks: Practical Veterinary Pharmacology, Materia Medica and Therapeutics, sixth edition, 1949, pages 630, 631, 632 and 641.

Technical Information, March 6, 1956, pages 2 and 3, U.S. Dispensatory, 25th edition, 1955, Lippincott Co., Philadelphia, Pa., pages 266, 267, 640, 641, 1304 and 1305.

JULIAN S. LEVITT, *Primary Examiner.*

LEWIS GOTTS, *Examiner.*